United States Patent Office 3,809,660
Patented May 7, 1974

3,809,660
EPOXIDE RESIN MIXTURES OF HETEROCYCLIC
N,N'-DIGLYCIDYL COMPOUNDS
Jurgen Habermeier, Pfeffingen, Daniel Porret, Binningen, and Dieter Baumann, Birsfelden, Switzerland, assignors to Ciba-Geigy Corporation, Ardsley, N.Y.
No Drawing. Filed Dec. 26, 1972, Ser. No. 318,319
Claims priority, application Switzerland, Dec. 30, 1971, 19,178/71
Int. Cl. C08g 30/02
U.S. Cl. 260—2 EP                   8 Claims

ABSTRACT OF THE DISCLOSURE

New epoxide resin mixtures containing a major proportion of higher-molecular N,N'-diglycidyl compounds of cyclic ureide derivatives are obtained if 1 mol of a cyclic ureide, such as hydantoin or dihydrouracil, is reacted with 1.2–3.0 mols of epihalogenohydrin in a known manner.

The new epoxide resin mixtures are suitable for the manufacture of mouldings and coatings having good mechanical properties and display the advantage, as compared to the low molecular N,N'-diglycidyl compounds of cyclic ureides, that on gelling a slighter exothermic effect occurs and on curing a slighter shrinkage occurs.

---

The present invention relates to curable epoxide resin mixtures of heterocyclic N,N'-diglycidyl compounds, a process for their manufacture and their use.

It is known that the corresponding N,N'-diglycidyl compounds can be manufactured by reaction of epihalogenohydrin with cyclic ureides such as hydantoin or parabanic acid. Such compounds are obtained according to the process described in British patent specification No. 1,148,570 by using a large molar excess of epihalogenohydrin per equivalent NH group of the cyclic ureide.

Whilst the N,N'-diglycidyl compounds manufactured in this way and containing one heterocyclic ring are valuable epoxide resins which can be converted into shaped articles and coatings having good mechanical properties, these resins also suffer from some disadvantages for many industrial applications. As a result of the relatively great exothermic effect occurring on gelling of these resins, the substrates or articles to be coated can easily be damaged. The shrinkage occurring during curing of the resins also easily leads to damage or shifting of the articles to be potted and the manufacture of shaped articles of large volume which are free of cavities and cracks frequently proves difficult.

It has now been found that these disadvantages can largely be reduced if instead of the known N,N'-diglycidyl compounds of cyclic ureides certain epoxide resin mixtures are used which contain, in addition to the known N,N'-diglycidyl compounds, a major proportion of higher-molecular N,N'-diglycidyl compounds of cyclic ureide derivatives.

The subjects of the present application are therefore epoxide resin mixtures of heterocyclic N,N'-diglycidyl compounds of the Formula I

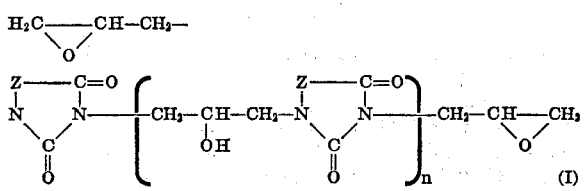

(I)

wherein Z denotes an unsubstituted or substituted methylene or ethylene group and n denotes numbers from 0 to about 12, preferably 0 to 7, with the proportion, in the epoxide resin mixture, of the compound with $n=0$ being less than 50 mol percent, preferably less than 30 mol percent.

In the Formula I, Z preferably denotes one of the following groups:

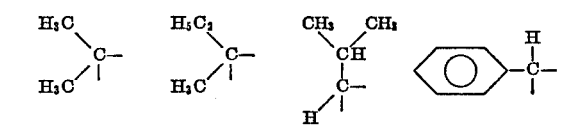

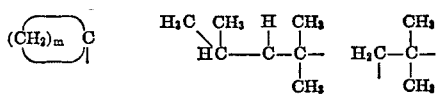

$m=4$ or 5.

The epoxide resin mixtures are manufactured according to the invention by reacting 1 mol of a cyclic ureide of the Formula II

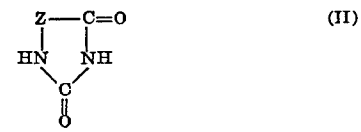

(II)

wherein Z has the same meaning as in the Formula I, with 1.2–3.0 mols of epihalogenohydrin, preferably 1.5–2.0 mols of epihalogenohydrin, in the presence of a catalyst and treating the resulting product containing halogenohydrin groups with agents which split off hydrogen halide.

Preferably, epichlorohydrin is used as the epihalogenohydrin. However, epibromohydrin or β-methyl-epichlorohydrin can also be used with advantage.

Suitable catalysts for the reaction of the epihalogenohydrin with the cyclic ureide are above all tertiary amines such as triethylamine, tri-n-propylamine, benzyldimethylamine, N,N-dimethylaniline and triethanolamine; quaternary ammonium bases such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines with a tertiary nitrogen atom, such as 1,1-dimethylhydrazines, which can also be employed in a quaternized form; alkali halides such as lithium chloride, potassium chloride and sodium chloride, bromide or fluoride; further, ion exchange resins with tertiary or quaternary amino groups, and also ion exchangers with acid amide groups. Basic impurities which can occur in technical commercial available forms of the starting compounds can also act as catalysts. In such cases it is not necessary to add a special catalyst.

The reaction of the epihalogenohydrin with the compound of the Formula II is as a rule carried out at an elevated temperature, for example 60–200° C. Preferably, the reaction temperature is 70–150° C.

As a rule, strong alkalis, such as anhydrous sodium hydroxide or concentrated sodium hydroxide solution, are used as agents splitting off hydrogen halide in the process; however, other alkaline reagents, such as potassium hydroxide, barium hydroxide, calcium hydroxide, sodium carbonate or potassium carbonate can also be used. The cyclic ureides used as starting substances of the Formula II are above all hydantoin, hydantoin derivatives, dihydrouracil and dihydrouracil derivatives.

The reaction of the epichlorohydrin with a compound of the Formula II can also be carried out in the presence of solvents. However, such solvents can also be added in a later stage of the reaction, for example before, during or after the dehydrohalogenation.

Hydantoin and its preferred derivatives correspond to the general formula

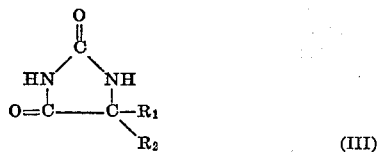

(III)

wherein $R_1$ and $R_2$ each denote a hydrogen atom or a lower alkyl radical with 1 to 4 carbon atoms, or wherein $R_1$ and $R_2$ together form a tetramethylene or pentamethylene radical. Hydantoin, 5-methylhydantoin, 5-methyl-5-ethylhydantoin, 5 - n-propylhydantoin, 5-isopropylhydantoin, 1,3 - diaza-spiro(4.5)-decane-2,4-dione, 1,3-diaza-spiro(4.4)-nonane-2,4-dione and preferably 5,5-dimethylhydantoin may be mentioned.

Dihydrouracil (=2,4-dioxo-hexahydropyrimidine) and its preferred derivatives correspond to the general formula

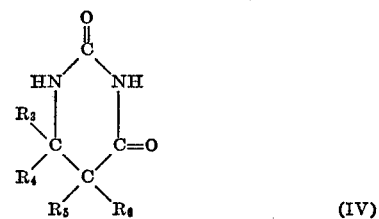

(IV)

wherein $R_3$ and $R_4$ independently of one another each denote a hydrogen atom or an alkyl group and $R_5$ and $R_6$ both individually denote a hydrogen atom or identical or different alkyl groups, preferably with 1 to 4 carbon atoms.

Preferably, in the above formula, $R_3$ denotes a hydrogen atom, $R_4$ denotes a hydrogen atom or a lower alkyl group and $R_5$ and $R_6$ denote methyl groups.

The following may be mentioned: 5,6-dihydrouracil, 5,5 - dimethyl-5,6-dihydrouracil (2,4-dioxo-5,5-dimethyl-hexahydropyrimidine) and 5,5-dimethyl-6-isopropyl-5,6-dihydrouracil (2,4 - dioxo-5,5-dimethyl-6-isopropylhexahydropyrimidine).

The epoxide resin mixtures, manufactured according to the invention, of heterocyclic N,N'-diglycidyl compounds of the Formula I are as a rule clear, colorless to slightly brown-colored resins of medium to high viscosity at room temperature, which do not crystallize out.

The epoxide resin mixtures react with the customary curing agents for polyepoxide compounds and can therefore be crosslinked or cured by addition of such curing agents analogously to other polyfunctional epoxide compounds or epoxide resins. Preferably, polybasic carboxylic acids and their anhydrides are used for curing the epoxide resin mixtures, for example phthalic anhydride, Δ⁴-tetrahydrophthalic anhydride, hexahydrophthalic anhydride, 4-methyl-hexahydrophthalic anhydride, 3,6-endomethylene-Δ⁴-tetrahydrophthalic anhydride, methyl-3,6-endomethyleneΔ⁴-tetrahydrophthalic anhydride (=methylnadic anhydride), 3,4,5,6,7,7-hexachloro-3,6-endomethylene-Δ⁴-tetrahydrophthalic anhydride, succinic anhydride, adipic anhydride, azelaic anhydride, sebacic anhydride, maleic anhydride, dodecenylsuccinic anhydride, pyromellitic dianhydride, or mixtures of such anhydrides.

Furthermore, curing accelerators can be employed in the curing reaction. In the curing reaction by means of polycarboxylic anhydrides, suitable accelerators are, for example, tertiary amines, their salts or quaternary ammonium compounds, for example 2,4,6 - tris-(dimethylaminomethyl) - phenol, benzyldimethylamine, 2-ethyl-4-methyl-imidazole, 4-aminopyridine and triamylammonium phenolate, and also alkali metal alcoholates, such as, for example, sodium hexanetriolate.

The term "curing" as used here denotes the conversion of the epoxide resin mixtures into insoluble and infusible crosslinked products, in particular, as a rule, with simultaneous shaping to give shaped articles, such as castings, pressings or laminates and the like, or to give coatings, coverings, lacquer films or adhesive bonds.

The curing reaction is as a rule carried out at elevated temperature, and, depending on the choice of the curing agent, at temperatures of 50–180° C. If desired, the curing reaction can also be carried out in 2 stages by first prematurely stopping the curing reaction or carrying out the first stage at an only moderately elevated temperature, whereby a curable precondensate which is still fusible and soluble (a so-called "B-stage") is obtained from the epoxide resin component and the curing agent component. Such a precondensate can serve, for example, for the manufacture of "prepregs," compression moulding compositions or sintering powders.

Hence, a further subject of the present invention are curable mixtures which are suitable for the manufacture of shaped articles, coatings, coverings, lacquer films or adhesive bonds and which contain the epoxide resin mixtures manufactured according to the invention together with curing agents for epoxide resins, preferably polycarboxylic acid or its anhydrides.

The epoxide resin mixtures manufactured according to the invention, or their mixtures with epoxide resin curing agents, can furthermore be mixed, in any stage before curing, with customary modifiers, such as extenders, fillers and reinforcing agents, pigments, dyestuffs, organic solvents, plasticizers, flow control agents, agents for conferring thixotropy, flameproofing substances or mould release agents.

Particularly for use in the lacquer field, the polyepoxide compounds according to the invention can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures are in particular suitable for use as casting resins, electrical resins and lacquer resins, and for the manufacture of compression moulding compositions.

In the examples which follow, parts denote parts by weight and percentages denote percentages by weight.

To determine the mechanical properties of the curable mixtures described in the examples which follow, sheets of size 92 x 41 x 12 mm. were manufactured for the determination of flexural strength, deflection, impact strength and water absorption. The test specimens (60 x 10 x 4 mm.) for determining the water absorption and for the flexural test and impact test (VSM [1] 77,103 and VSM 77,105 respectively) were machined from the sheets.

Test specimens of dimensions 120 x 15 x 10 mm. were cast in each case for determining the heat distortion point according to Martens (DIN [2] 53,458).

MANUFACTURING EXAMPLES

Example 1

A mixture of 768 g. of 5,5-dimethylhydantoin (6 mols), 925 g. of epichlorohydrin (10 mols) and 10 g. of 50% strength aqueous tetramethylammonium chloride solution is warmed to 70° C. whilst stirring. Hereupon a strongly exothermic reaction starts and the heating bath is replaced by a cooling bath at −10° C. The temperature then rises to 148° C. and at the same time the suspension changes to a clear melt. When the exothermic effect has subsided, ---
[1] Verein Schweizerischer Maschinenindustrieller.
[2] Deutsche Industrie-Norm.

the mixture is stirred for a further 30 minutes at 90° C. 704 g. of a 50% strength sodium hydroxide solution (8.8 mols) are then added dropwise over the course of 135 minutes at 60–70° C. under reduced pressure (80–100 mm. Hg) whilst stirring vigorously; at the same time the water present in the reaction mixture is continuously removed azeotropically from the batch, and separated off. The reaction mixture becomes rather viscous towards the end. After the dropwise addition of the sodium hydroxide solution, 500 ml. of epichlorohydrin were added and water was further removed from the system until a total of 491 ml. of water have been separated off. The batch is cooled to 40° C., diluted with 2.5 litres of chloroform and then cooled to room temperature. The sodium chloride produced in the reaction is removed by suction filtration. To remove remnants of sodium chloride and sodium hydroxide the solution is twice washed with 250 ml. of water and concentrated on a rotary evaporator at 50–60° C. under a water pump vacuum. 100 ml. of water are then added to remove traces of epichlorohydrin azeotropically from the mixture by distillation; thereafter this operation is repeated with 100 ml. of toluene. The epoxide resin is then dried to constant weight at 65° C./0.2 mm. Hg. 1,088 g. of a viscous epoxide resin with 4.39 epoxide equivalents/kg. are obtained. The molecular distribution for the epoxide resin mixture of the Formula I can be estimated from the gel permeation chromatogram to be the following: $n=0$: ~22%, $n=1$: ~22%, $n=2$: ~16%, $n=3$: ~12%, $n>3$: ~28%.

Example 2

768 g. of 5,5-dimethylhydantoin (6 mols) together with 462.5 g. of epichlorohydrin (5 mols) and 10 g. of 50% strength aqueous tetramethylammonium chloride are warmed to 60° C. An exothermic reaction commences immediately and the heating bath is replaced by an ice water bath. The temperature then rises to 90° C. 462.5 g. of epichlorohydrin (5 mols) are added dropwise over the course of 15 minutes to the melt of the reaction mixture and thereafter the batch is stirred for a further 30 minutes at 85–90° C. Dehydrohalogenation is then carried out in accordance with Example 1, with 600 g. of 50% strength aqueous sodium hydroxide solution. Working up takes place according to Example 1. 1,148 g. of a viscous, almost colorless resin with 5.0 epoxide equivalents/kg. are obtained. The total chlorine content is 0.7%.

The molecular distribution for the resulting epoxide resin mixture of the Formula I can be estimated from the gel permeation chromatogram to be the following: $n=0$: ~45%, $n=1$: ~24%, $n=2$: ~15%, $n=3$: ~7.5%, $n>3$: ~5%.

Example 3

The reaction vessel used is a sulphonation flask of 2.5 litres capacity which is equipped with a stirrer, thermometer, two 250 ml. dropping funnels and a 30 cm. long fractionating column filled with Raschig rings. The fractionating column carries a fractionating column with a head thermometer and an attached receiver.

309 g. (3.34 mols) of epichlorohydrin, 336 g. (2.0 mols) of 5,5 - pentamethylenehydantoin (=1,3 - diazaspiro-[4,5]-decane-2,4-dione), 750 ml. of dioxane and 3.3 g. of a 50% strength aqueous solution of trimethylammonium chloride are initially introduced into the reaction vessel, and warmed. The reaction mixture, which initially can hardly be mixed, becomes stirrable at 105° C. and reflux commences at an internal temperature of approx. 115° C., which is now kept constant. The dropwise addition of 235 g. (2.93 mols) of a 50% strength aqueous sodium hydroxide solution is then started whilst simultaneously distilling off dioxane and water of reaction at the same speed, this requiring 160 minutes. When, after approx. 120 minutes, about 180 g. of aqueous sodium hydroxide solution have been added dropwise and approx. 340 ml. of distillate are present, the dropwise addition of a total of 300 ml. of dioxane is started from the second dropping funnel in order to keep the reaction mixture stirrable. Sodium hydroxide solution and dioxane are now added dropwise simultaneously over the course of 40 minutes. The addition of dioxane should be complete approx. 75 minutes after the completion of the addition of sodium hydroxide solution. The distillation temperature in the fractionating column head is then about 89° C.; the temperature of the reaction mixture fluctuates between 89 and 108° C. After completion of the addition of dioxane, distillation is continued until a total of 880 ml. of distillate are present.

500 ml. of epichlorohydrin are now added dropwise to the reaction mixture over the course of 30 minutes and distillation is continued at 140° C. bath temperature. When approx. 1,000 ml. of distillate are present the reaction is stopped and the mixture is filtered hot, the filter residue is washed with 100 ml. of epichlorohydrin and the epichlorohydrin solutions are washed with water. The organic phases are dried with sodium sulphate until free of water and are concentrated under reduced pressure in a rotary evaporator. 469 g. of an epoxide resin mixture with an epoxide content of 1.1 equivalents/kg. are obtained.

The resulting product shows a numerical average molecular weight $\overline{M}_n \sim 1,250$ and the weight average molecular weight is $\overline{M}_w \sim 2,096$.

For this product, the index $n$ of Formula I is on average 4.5.

Separation by gel chromatography shows that at 49 percent by weight of the product $n>6$ and at 19 percent by weight $n>12$.

Example 4

274.8 g. (1.5 mols) of 5,5-dimethyl-6-isopropyl-5,6-dihydrouracil, 185 g. of epichlorohydrin (2.0 mols) and 2.5 g. of tetramethylammonium chloride are slowly warmed to 150° C. internal temperature over the course of 4 hours, whilst stirring. At this temperature, the mixture is allowed to react for a further 3 hours, 350 ml. of toluene are subsequently added and 176 g. of 50% strength aqueous sodium hydroxide solution are then added dropwise over the course of 125 minutes at 60° C. internal temperature (bath temperature 150° C.) under azeotropic circulatory distillation and a vacuum of 100–150 mm. Hg. 5 minutes after completion of the dropwise addition, 200 ml. of epichlorohydrin are introduced, the process is allowed to continue for a further 20 minutes, 100 ml. of epichlorohydrin are again added and the cloudy reaction mixture is subsequently filtered to remove the sodium chloride. The cloudy filtrate is diluted with 500 ml. of chloroform and extracted by shaking with 100 ml. of 10% strength aqueous $NaH_2PO_4$ solution in a separating funnel. The 2 phases are separated and the organic phase is washed 3 times with 100 ml. of water at a time. After separating off the aqueous phase, the organic phase is concentrated on a rotary evaporator under a water pump vacuum. To remove solvent remnants, the product is dried for 30 minutes at 160° C. and $10^{-1}$ mm. Hg. 386 g. of a clear, brown, brittle resin with an epoxide content of 1.22 epoxide equivalents/kg. are obtained. The softening point (according to Kofler) is 102° C.

The molecular weight determination after separation by gel chromatography gives the following values: $\overline{M}_n \sim 1,058$, $\overline{M}_w \sim 2,097$.

42 percent by weight of the product display a value of $n>6$ and 19 percent by weight of the product display a value of $n>12$.

Example 5

A mixture of 140 g. of 5-methyl-5-ethylhydantoin (1.0 mol), 154.5 g. of epichlorohydrin (1.67 mols) and 1.67 g. of tetramethylammonium chloride is warmed to 70° C., whereupon a strong exothermic reaction occurs which is controlled to 142° C. internal temperature by cooling with ice water. Reaction is allowed to continue for a further 30 minutes at 90°–130° C., 300 ml. of toluene are then added and 117.6 g. of 50% strength aqueous sodium hydroxide solution are added dropwise to the clear solution whilst carrying out an azeotropic circulatory distillation in a vacuum of 100–150 mm. Hg at 60° C. After 2 hours of the dropwise addition, the reaction mixture becomes viscous and 83.3 g. of epichlorohydrin are added. The mixture can now again be stirred easily and after 137 minutes the dropwise addition of the sodium hydroxide solution is complete. Thereafter the reaction is allowed to continue for a further 30 minutes, 200 ml. of epichlorohydrin are added and the mixture is filtered. The cloudy filtrate is diluted with 200 ml. of chloroform and worked up analogously to Example 4.

193 g. of a clear, yellowish somewhat sticky resin are obtained, having an epoxide content of 3.54 epoxide equivalents/kg. The resin contains 0.13% of chlorine.

Separation of the product by gel chromatography gave the following values: $\bar{M}_n \sim 592$, $\bar{M}_w \sim 956$.

15 percent by weight of the product show $n > 6$ and 2.3 percent by weight of the product show $n > 12$.

USE EXAMPLES

Example I 100 g. of the epoxide resin mixture obtained according to Manufacturing Example 2, having an epoxide content of 5.0 equivalents/kg., are stirred with 73 g. of hexahydrophthalic anhydride and 0.2 g. of 1-methylimidazole at 80° C. to give a homogeneous melt, which is subjected to a vacuum and poured into aluminium moulds of 4 mm. wall thickness, prewarmed to 80° C. Curing takes place in 2 hours at 80° C., 2 hours at 120° C. and 12 hours at 150° C. Mouldings having the following properties are obtained.

Heat distortion point (DIN [1] 53,461) ___° C__ 118–120
Water absorption (4 days/20° C.) __percent__ 0.47
Impact strength (VSM [2] 77,105) _cmkp./cm.$^2$__ 12–13
Flexural strength (VSM 77,103) __kp./mm.$^2$__ 12–13

[1] DIN=Deutsche Industrie-Norm.
[2] VSM=Verein Schweizerischer Maschinenindustrieller.

Example II 100 parts of the epoxide resin manufactured according to Example 1, having an epoxide content of 4.39 equivalents/kg., are well mixed with 65 parts of hexahydrophthalic anhydride at 100° C. The mixture is cured in an aluminium mould for 4 hours at 100° C. and 14 hours at 140° C. The resulting moulding has the following properties.

Flexural strength (VSM 77,103) _____kp./mm.$^2$__ 15.5
Deflection (VSM 77,103) _____mm__ 5.5
Impact strength (VSM 77,105) _____cmkp./cm.$^2$__ 15.5
Heat distortion point, according to Martens (DIN 53,458) _____°C__ 126
Hot water absorption, 1 hour at 100° C. __percent__ 1.3

Example III 100 parts of the epoxide resin manufactured according to Example 2, with an epoxide content of 5.0 equivalents/kg., are well mixed with 75 parts of hexahydrophthalic anhydride at 100° C. This mixture is cured in an aluminium mould for 4 hours at 100° C. and 16 hours at 140° C. A moulding having the following properties is obtained.

Flexural strength (VSM 77,103) ____kp./mm.$^2$__ 14
Deflection (VSM 77,103) _____mm__ 4–5
Impact strength (VSM 77,105) ____cmkp./cm.$^2$__ 13–14
Heat distortion point, according to Martens (DIN 53,458) _____°C__ 113
Hot water absorption, 1 hour at 100° C. _percent__ 1.3

Example IV 100 parts of the epoxide resin manufactured according to Example 2, with an epoxide content of 5.0 equivalents/kg., are mixed with 75 parts of hexahydrophthalic anhydride at 120° C. 100 parts of this curable epoxide resin mixture are poured into a cylindrical aluminium mould (diameter: 3 cm., height: 13 cm., wall thickness: 0.1 mm.) and are gelled for one hour at 120° C. A temperature maximum of 240° C. is measured in the center of the casting composition.

The above-mentioned curable epoxide resin mixture is poured into cylindrical aluminium moulds of 10 cm. diameter and 1 cm. height and cured for 24 hours at 120° C. The total volume shrinkage of the cured mouldings is 1.8%.

Comparison example 100 parts of 1,3-diglycidyl-5,5-dimethylhydantoin with an epoxide content of 8.0 equivalents/kg. are mixed with 120 parts of hexahydrophthalic anhydride at 120° C. 100 parts of this curable epoxide resin mixture are poured into a cylindrical aluminium mould (diameter: 3 cm., height: 13 cm., wall thickness: 0.1 mm.) and gelled for one hour at 120° C. A temperature maximum of 300° C. is measured in the center of the casting composition.

The above-mentioned curable epoxide resin mixture is poured into cylindrical aluminium moulds of 10 cm. diameter and 1 cm. height and cured for 24 hours at 120° C. The total volume shrinkage of the cured mouldings is 3.9%.

As can be seen from the comparison experiment, the temperature maximum which occurs when gelling the curable expoxide resin mixture according to the invention is 60° C. lower than when using 1,3-diglycidyl-5,5-dimethylhydantoin, and the volume shrinkage found on the cured mouldings is comparatively reduced by more than half.

What is claimed is:

1. Epoxide resin mixture consisting of heterocyclic N,N'-diglycidyl compounds of the formula

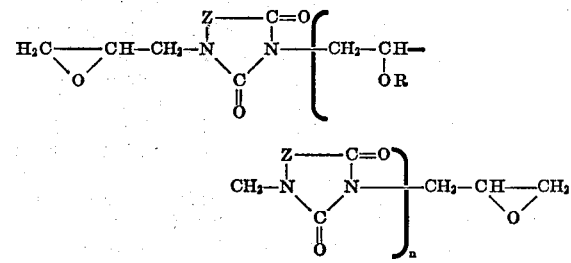

wherein Z denotes a methylene group, an ethylene group, or a group denoted by one of the formulas:

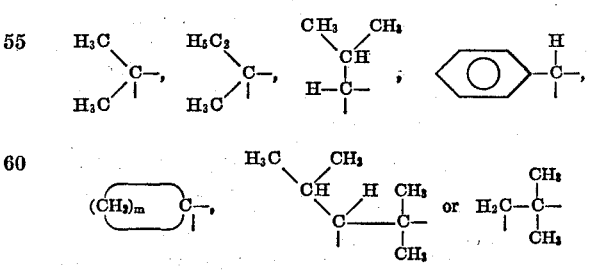

wherein $m=4$ or 5, and $n$ denotes numbers from 0 to about 12, with the proportion of the compound with $n=0$ in the epoxide resin mixture being less than 50 mol percent.

2. Epoxide resin mixture according to claim 1, wherein in the formula $n$ denotes numbers from 0 to 7.

3. Epoxide resin mixture according to claim 1, wherein the proportion of compounds with $n=0$ is less than 30 mol percent.

4. Epoxide resin mixture according to claim 1, wherein in the formula Z denotes one of the following groups

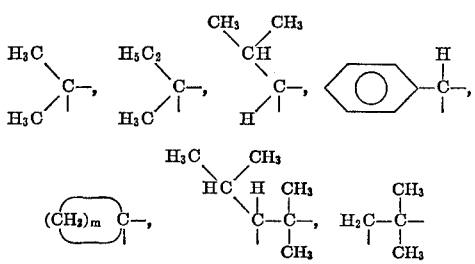

5. Epoxide resin mixture according to claim 1, wherein in the formula Z denotes the group

6. A curable mixture consisting essentially of (a) epoxide resin mixture of heterocyclic N,N'-diglycidyl compounds according to claim 1 and (b) an epoxide resin curing agent.

7. Curable mixture according to claim 6, containing a polycarboxylic acid or a polycarboxylic acid anhydride as the curing agent (b).

8. Curable mixture according to claim 7, containing hexahydrophthalic anhydride as the polycarboxylic acid anhydride.

References Cited
UNITED STATES PATENTS
3,449,353   6/1969   Porret et al. _____ 260—309.5
3,562,275   2/1971   Habermeier et al. ____ 260—260

WILLIAM H. SHORT, Primary Examiner

E. A. NIELSEN, Assistant Examiner

U.S. Cl. X.R.
260—2 EC, 2 EA, 78.4 EP, 830 TW